(12) United States Patent
Nishitsuji (10) Patent No.: US 10,129,547 B2
(45) Date of Patent: Nov. 13, 2018

(54) IMAGE PROCESSING APPARATUS

(71) Applicant: MITSUBISHI ELECTRIC CORPORATION, Tokyo (JP)

(72) Inventor: Takashi Nishitsuji, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/553,637

(22) PCT Filed: Feb. 26, 2015

(86) PCT No.: PCT/JP2015/000999
§ 371 (c)(1),
(2) Date: Aug. 25, 2017

(87) PCT Pub. No.: WO2016/135777
PCT Pub. Date: Sep. 1, 2016

(65) Prior Publication Data
US 2018/0048893 A1 Feb. 15, 2018

(51) Int. Cl.
*H04N 19/14* (2014.01)
*G06T 7/136* (2017.01)
(Continued)

(52) U.S. Cl.
CPC .............. *H04N 19/14* (2014.11); *G06T 7/13* (2017.01); *G06T 7/136* (2017.01); *G06T 7/215* (2017.01);
(Continued)

(58) Field of Classification Search
CPC .... H04N 19/14; H04N 19/176; H04N 19/139; G06T 7/136; G06T 7/13; G06T 2207/10016
See application file for complete search history.

(56) References Cited

U.S. PATENT DOCUMENTS

| 7,813,528 B2 | 10/2010 | Porikli et al. |
| 8,000,393 B2 | 8/2011 | Tanaka |

(Continued)

FOREIGN PATENT DOCUMENTS

| JP | 6-351011 A | 12/1994 |
| JP | 7-121789 A | 5/1995 |

(Continued)

*Primary Examiner* — Bhavesh Mehta
*Assistant Examiner* — Menatoallah Youssef
(74) *Attorney, Agent, or Firm* — Birch, Stewart, Kolasch & Birch, LLP (57) ABSTRACT

In order to obtain an image processing apparatus whose object is to realize edge detection with utilizing motion vectors calculated during image encoding, included are: a motion vector processing part to calculate, for each macroblock, information concerning a motion between frames, from motion vectors included in an encoded image signal; a motion vector filter to let through motion vectors each having a predetermined piece of information out of the calculated information; a frame counter to output a count end signal when a counted number of frames of the encoded image signal received by the motion vector processing part reaches a predetermined number of frames; a frequency counter to integrate a frequency of the motion vectors let through the motion vector filter over the predetermined number of frames for each macroblock; and an edge determiner to determine, upon reception of the count end signal, whether or not the frequency integrated by the frequency counter for each macroblock exceeds a threshold, and if the integrated frequency exceeds the threshold, judge a macroblock concerned as being an edge.

5 Claims, 9 Drawing Sheets

(51) Int. Cl.
*H04N 19/176* (2014.01)
*G06T 7/13* (2017.01)
*H04N 19/139* (2014.01)
*H04N 19/513* (2014.01)
*H04N 19/85* (2014.01)
*G06T 7/215* (2017.01)

(52) U.S. Cl.
CPC ......... *H04N 19/139* (2014.11); *H04N 19/176* (2014.11); *H04N 19/513* (2014.11); *H04N 19/85* (2014.11); *G06T 2207/10016* (2013.01)

(56) References Cited

U.S. PATENT DOCUMENTS

| | | | |
|---|---|---|---|
| 8,565,311 | B2 | 10/2013 | Ohira |
| 9,609,318 | B2 | 3/2017 | Matsuo et al. |
| 2007/0127565 | A1* | 6/2007 | Mietens ............... H04N 19/176 375/240.03 |
| 2008/0247599 | A1 | 10/2008 | Porikli et al. |
| 2009/0086821 | A1 | 4/2009 | Ohira |
| 2010/0135397 | A1 | 6/2010 | Tanaka |
| 2013/0128984 | A1 | 5/2013 | Matsuo et al. |
| 2013/0170557 | A1* | 7/2013 | Wang ..................... H04N 19/00 375/240.24 |

FOREIGN PATENT DOCUMENTS

| | | |
|---|---|---|
| JP | 8-69597 A | 3/1996 |
| JP | 8-329252 A | 12/1996 |
| JP | 2000-295599 A | 10/2000 |
| JP | 2001-250118 A | 9/2001 |
| JP | 2008-27221 A | 2/2008 |
| JP | 2008-257693 A | 10/2008 |
| JP | 2009-89177 A | 4/2009 |
| JP | 2010-130558 A | 6/2010 |
| JP | 2010-278963 A | 12/2010 |
| JP | 2012-15616 A | 1/2012 |
| JP | 2012-44238 A | 3/2012 |
| JP | 2013-66016 A | 4/2013 |
| JP | 2014-186550 A | 10/2014 |

\* cited by examiner

IMAGE PROCESSING APPARATUS

TECHNICAL FIELD

The present invention relates to an image processing apparatus which detects an edge component of an image with using motion vectors included in a compressed video.

BACKGROUND ART

An image edge (contour) detection technique is known widely as a feature amount detection means employed in image recognition and so on. For edge detection, a scheme which treats as an edge a pixel where the luminance gradient of an image takes an extremum is generally known. A smoothing process such as Sobel filter is often conducted as a pre-process in order to eliminate the influence of noise.

A moving picture photographed by a digital camera or the like is saved after it is encoded for the purpose of volume compression. Examples of an encoding means include a scheme called Moving Picture Expert Group (MPEG-2) employed for a Digital Versatile Disk (DVD)-VIDEO and an H.264 scheme which is a scheme employed for terrestrial digital broadcasting (one-segment broadcasting) aimed at mobile terminals and a Blu-ray (registered trademark) Disk. These encoding means adopt a compression method based on motion compensation that utilizes similarities between picture frames. An encoded image signal includes motion vectors indicating the positional relationship between similar portions of the frames, and differential values.

In detecting an edge from an encoded moving picture, an encoded image signal need be decoded, and a similar process need be conducted. For example, Patent Literature 1 discloses a method of detecting an edge of an image by calculating a gradient of the luminance signal of an actual image.

CITATION LIST

Patent Literature

Patent Literature 1: JP 8-329252 A

SUMMARY OF INVENTION

Technical Problem

In the prior art, an image processing apparatus having a high calculation processing capability has been sought for due to the large quantity of calculation processes involved in filtering and gradient calculation. In case of performing an edge process for an encoded image signal, processes such as gradient calculation need be performed after the decoding process. As a result, problems of a large calculation load and a large process delay exist.

The present invention has been made to solve the above problems, and has as its object to realize edge detection with utilizing motion vectors generated during image encoding or image decoding.

Solution to Problem

An image processing apparatus according to the present invention includes:

a motion vector processing part to receive motion vectors of an encoded image signal and calculate, for each macroblock, information concerning a motion of an image, from the motion vectors;

a motion vector filter to let through motion vectors each having a predetermined piece of information out of the information calculated by the motion vector processing part;

a frame counter to count the number of frames of the encoded image signal received by the motion vector processing part and, when the counted number reaches a predetermined number of frames, output a count end signal;

a frequency counter to integrate a frequency of the motion vectors let through the motion vector filter over the predetermined number of frames for each macroblock; and an edge determiner to determine, upon reception of the count end signal outputted from the frame counter, whether or not the frequency integrated by the frequency counter for each macroblock exceeds a threshold, and if an integrated frequency exceeds the threshold, judge a macroblock concerned as being an edge.

Advantageous Effects of Invention

According to the present invention, by utilizing motion vectors generated during image encoding or image decoding in edge detection, calculation processes involved in gradient calculation and filtering of the prior art become unnecessary. As a result, reduction of the processing load and shortening of the process delay can be realized.

DESCRIPTION OF EMBODIMENTS

Embodiment 1

Figure 1:
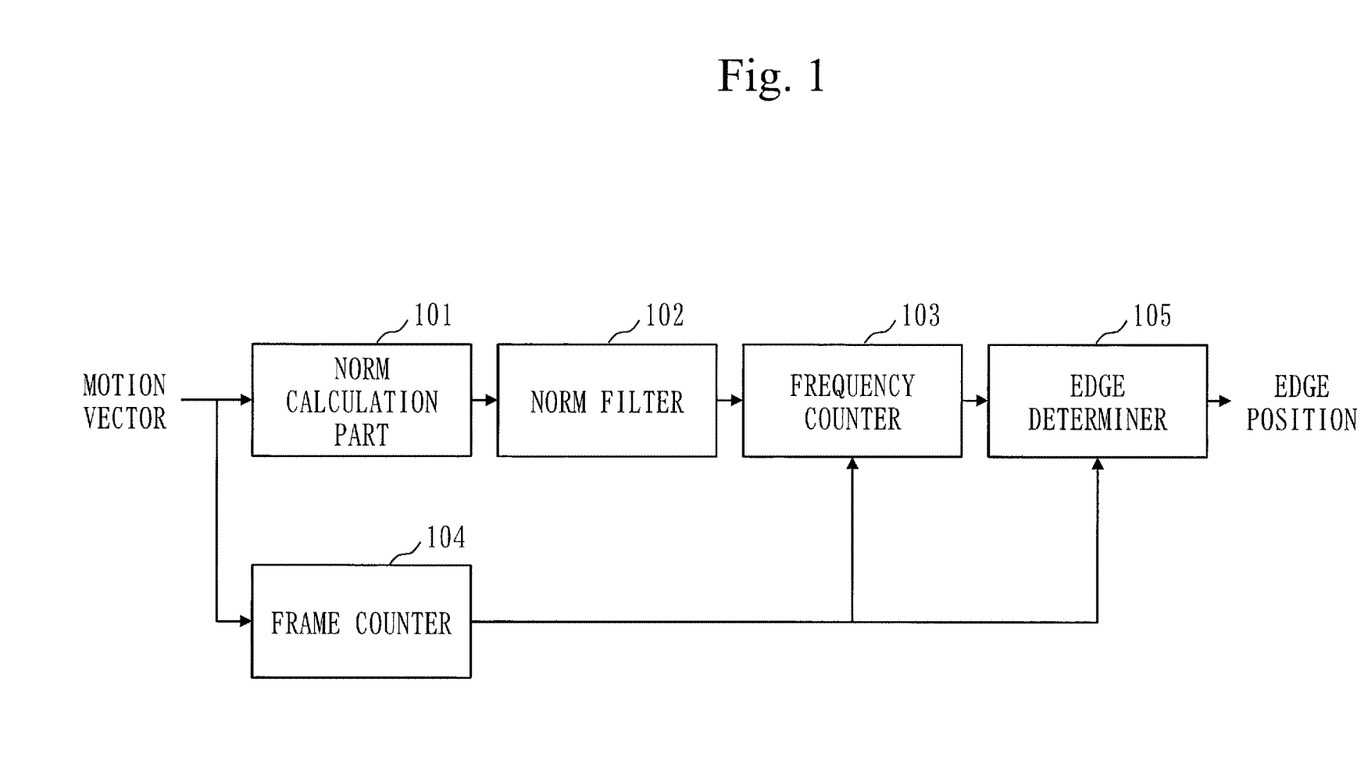
FIG. 1 is a configuration diagram illustrating an image processing apparatus according to Embodiment 1 of the present invention.

FIG. 1 is a configuration diagram illustrating an example of an image processing apparatus according to Embodiment 1 of the present invention. Referring to FIG. 1, reference numeral 101 denotes a norm calculation part being a motion vector processing part; 102, a norm filter being a motion vector filter; 103, a frequency counter; 104, a frame counter; and 105, an edge determiner. Each of these elements constituting the image processing apparatus of FIG. 1 can be implemented by hardware such as a processor, a memory, and so on of a computer.

An encoded image signal being a compressed image includes motion vectors indicating the positional relationship between similar portions of the frames, and differential values. The motion vectors are vectors representing the motion of an image between frames and are calculated during encoding of the compressed image. The norm calculation part 101 receives the motion vectors in units of frames. The norm calculation part 101 calculates a norm being information of an inputted motion vector, for each macroblock of the encoded image signal and outputs the calculated norm to the norm filter 102. The norm expresses the magnitude of the motion vector and expresses the magnitude of the motion of an image of a portion that is similar between frames. The norm can be converted into a numerical value expressed by pixels. There are various types of norm such as Euclidean norm, maximum value norm, and so on, and any type of norm can be employed. The calculated value of the norm may be expressed as an integer value obtained by rounding or the like.

The norm filter 102 determines whether or not the value of the norm calculated by the norm calculation part 101 is equal to or less than a predetermined reference value (for example, 1 or less), the predetermined reference value being predetermined information, and outputs a determination result to the frequency counter 103. The frequency counter 103 integrates the frequency with which the input from the norm filter 102 is determined as true, for each macroblock where a corresponding motion vector is located. The frequency counter 103 then outputs the frequency to the edge determiner 105. When the frequency counter 103 receives a notice from the frame counter 104 notifying that the counter value of the frame counter 104 exceeds a predetermined integrated number of frames (for example, 600 frames), the frequency counter 103 concludes that integration for a predetermined number of frames is completed, and resets the frequency counter value.

The frame counter 104 counts the number of inputted frames. When the number reaches the predetermined integrated number of frames, the frame counter 104 sends a notice of a count end signal to the frequency counter 103 and the edge determiner 105. Upon reception of the notice of the count end signal from the frame counter 104 notifying that the counter value exceeds the predetermined integrated number of frames, the edge determiner 105 refers to the output value of the frequency counter 103. The edge determiner 105 then determines whether or not the value of the frequency integrated for each macroblock exceeds a predetermined threshold (for example, 500), and outputs a determination result.

In the edge (contour) portion of an image, a small motion occurs in the image between frames. This small motion is supposed to have resulted from the optical system noise and so on of the imaging system. This small motion appears as a motion vector having a small norm in an encoded image signal. Hence, the edge of an image can be detected with using motion vectors through detection of a motion vector having a small norm.

Therefore, the edge of the image can be detected based on the determination result output from the edge determiner 105.

Figure 2:
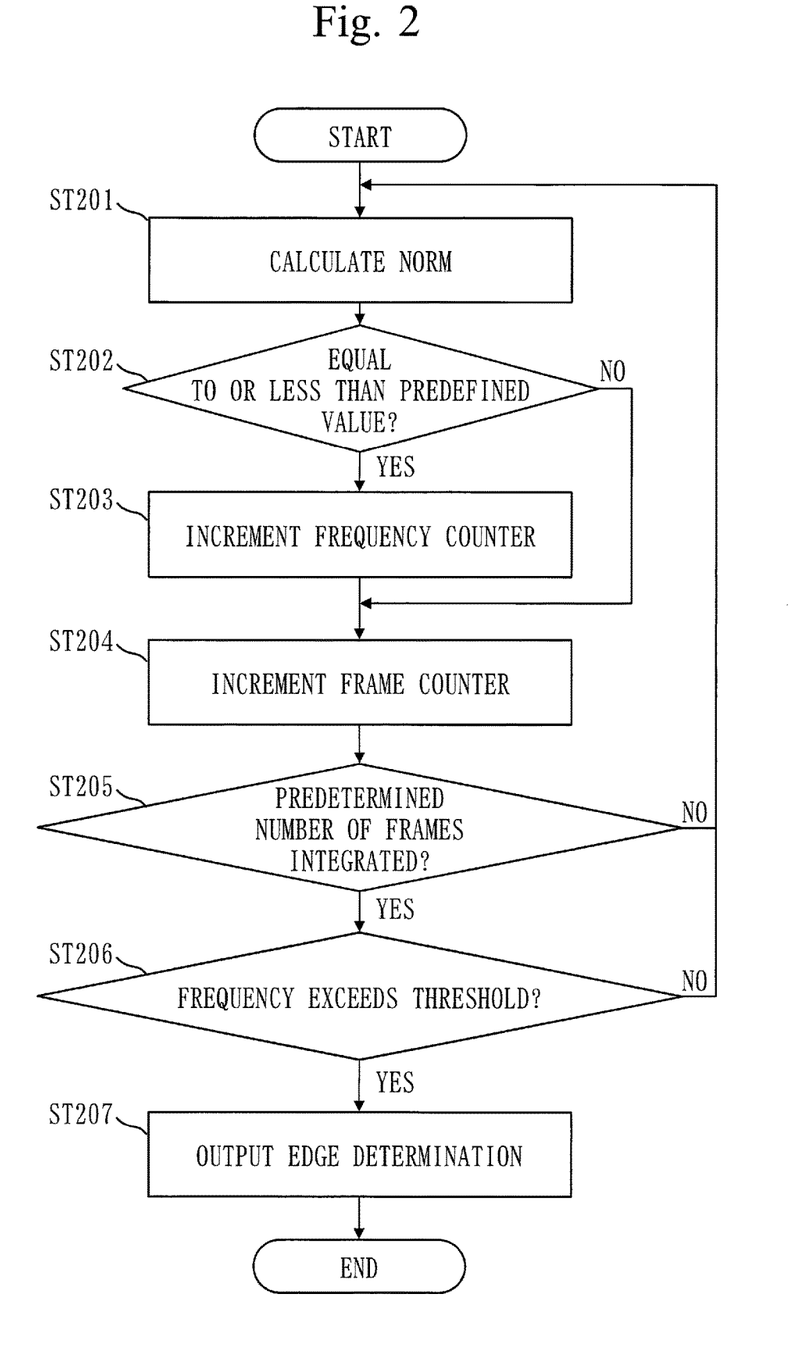
FIG. 2 is a flowchart illustrating processing details of the image processing apparatus according to Embodiment 1 of the present invention.

FIG. 2 is a flowchart illustrating processing details of the image processing apparatus according to Embodiment 1 of the present invention.

The flow of edge detection according to Embodiment 1 of the present invention will now be described with referring to FIG. 2.

The norm calculation part 101 calculates the norm of a motion vector inputted per frame and outputs the calculated norm to the norm filter 102 (ST201). The norm filter 102 determines whether or not the norm inputted from the norm calculation part 101 is equal to or less than the predetermined reference value and outputs a determination result to the frequency counter 103 (ST202). If the output from the norm filter 102 is below the reference value, the frequency counter 103 increments the number of times the norm filter 102 has made determination in the macroblock where the motion vector exists (ST203).

After that, the frame counter 104 updates the counter value of its own and records the number of inputted frames (ST204). If the counter value of the frame counter 104 is equal to or less than the predetermined integrated number of frames, the flow moves to the process for a motion vector in the next frame (ST205). If the value of the frame counter 104 exceeds the predetermined integrated number of frames, whether or not the frequency of the frequency counter 103 exceeds a threshold is judged (ST206). If the frequency exceeds the threshold, the macroblock where this motion vector is located is determined as an edge, and an edge position is outputted (ST207).

As described above, the image processing apparatus according to Embodiment 1 is capable of detecting an edge from an encoded image signal by utilizing a motion vector having a small norm resulting from the optical system noise of the imaging system.

Embodiment 2

Figure 3:
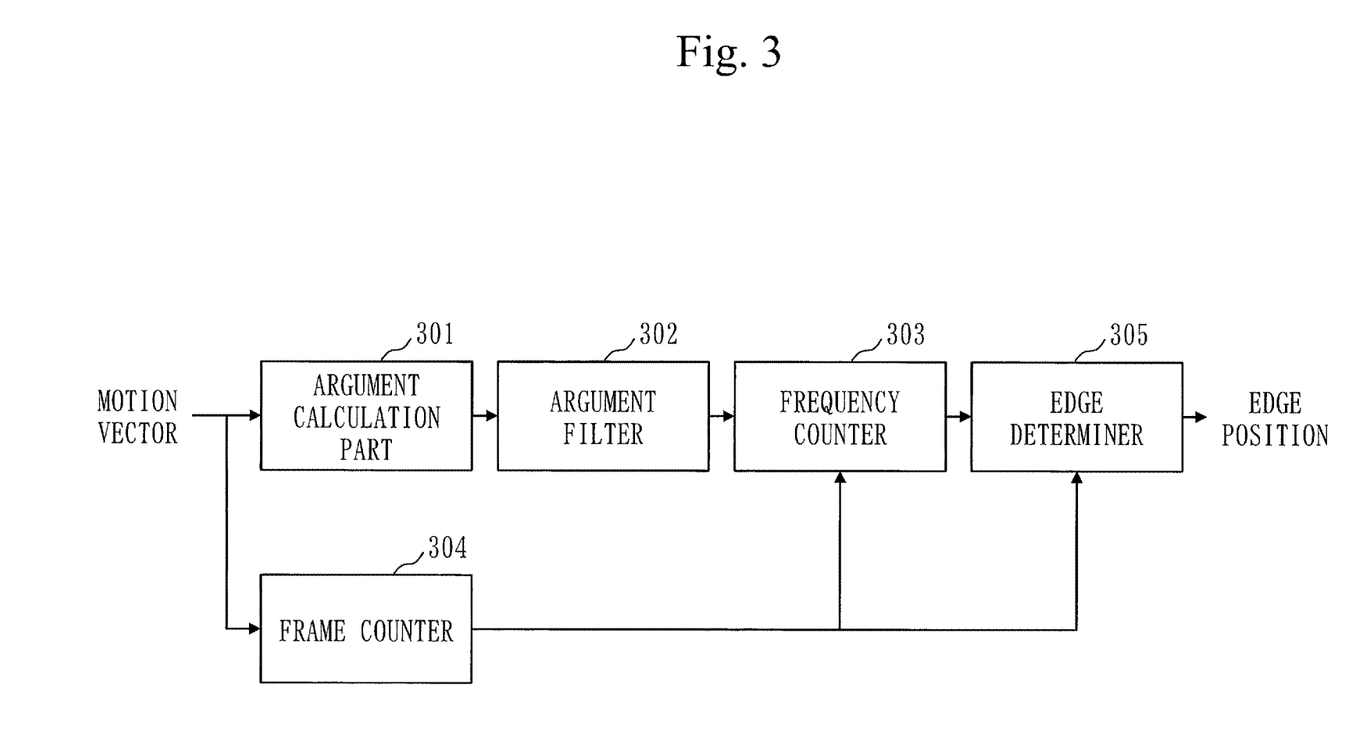
FIG. 3 is a configuration diagram illustrating an image processing apparatus according to Embodiment 2 of the present invention.

FIG. 3 is a configuration diagram illustrating an example of an image processing apparatus according to Embodiment 2 of the present invention. Referring to FIG. 3, reference numeral 301 denotes an argument calculation part being a motion vector processing part; 302, an argument filter being a motion vector filter; 303, a frequency counter; 304, a frame counter; and 305, an edge determiner. Each of these elements constituting the image processing apparatus of FIG. 3 can be implemented by hardware such as a processor, a memory, and so on of a computer.

The argument calculation part 301 receives motion vectors in units of frames. The argument calculation part 301 calculates an argument being information of a motion vector inputted per frame, and outputs a calculation result to the argument filter 302. The argument expresses the direction of the motion vector and expresses the direction of the motion of an image of a portion which is similar between frames. The horizontal direction, the vertical direction, the diagonal direction, and so on can be expressed with using the argument. The horizontal direction and the vertical direction are comprehensively referred to as the axial direction. With using the angle, the horizontal direction can be expressed as 0 degrees, 180 degrees, or the like, the vertical direction can be expressed as 90 degrees, 270 degrees, or the like, and the diagonal direction can be expressed as 45 degrees, 135 degrees, 225 degrees, 315 degrees, or the like.

The argument filter 302 determines which one between the diagonal direction (45 degrees, 135 degrees, 225 degrees, or 315 degrees) and the axial direction (0 degrees, 90 degrees, 180 degrees, or 270 degrees), each being predetermined information, the argument calculated by the argument calculation part 301 corresponds to, and outputs a determination result to the frequency counter 303. The frequency counter 303 integrates the frequency with which the input from the argument filter 302 is determined as true, for each macroblock where a corresponding motion vector is located. The frequency counter 303 then outputs the frequency to the edge determiner 305. When the frequency counter 303 receives a notice of a count end signal from the frame counter 304 notifying that the counter value of the frame counter 304 exceeds a predetermined integrated number of frames (for example, 600 frames), the frequency counter 303 concludes that integration for a predetermined number of frames is completed, and resets the frequency counter value.

The frame counter 304 counts the number of inputted frames. When the number reaches the predetermined integrated number of frames, the frame counter 304 notifies a determination result to the frequency counter 303 and the edge determiner 305. Upon reception of the notice of the count end signal from the frame counter 304 notifying that the counter value exceeds the predetermined integrated number of frames, the edge determiner 305 refers to the output value of the frequency counter 303. The edge determiner 305 determines whether or not the value integrated for each macroblock exceeds a threshold (for example, 500), and outputs a determination result.

The characteristic feature of the argument filter 302 in Embodiment 2 resides in having the same effect as filtering of the motion vector equal to or less than a reference value (for example, 1 or less), as with the norm filter 102 in Embodiment 1. The details of the characteristic feature will now be described.

Figure 4:
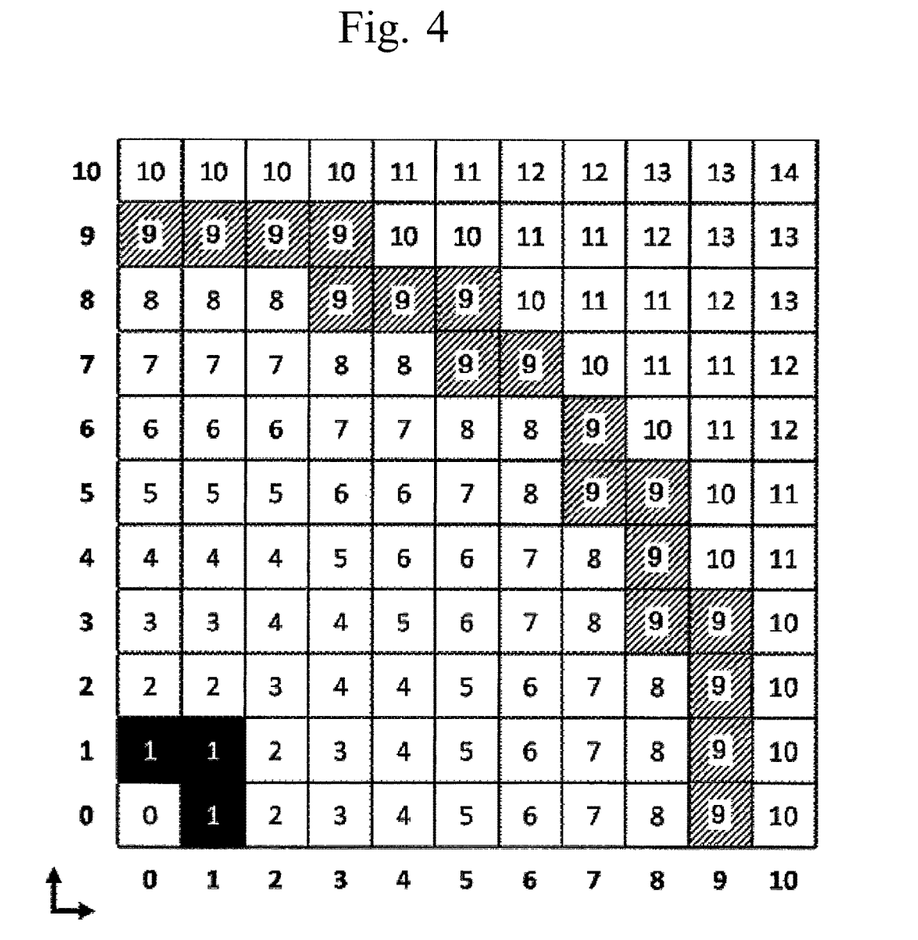
FIG. 4 is a diagram illustrating an operation principle of an argument calculation part and of an argument filter according to Embodiment 2 of the present invention.

A motion vector can also be expressed as a two-dimensional quantity with a value of an integer-level precision. In a pixel space discretized in integers, the norms of motion vectors are distributed in the first quadrant, as illustrated in FIG. 4. The norms illustrated in FIG. 4 are each a Euclidean norm expressed by an integer obtained by rounding the motion magnitude. As illustrated in FIG. 4, for example, the arguments of pixels corresponding to norms 1 are in three patterns which are 0 degrees, 45 degrees, and 90 degrees, and the arguments exist in only the axial direction and the diagonal direction. For example, as for pixels each corresponding to norm 9, there are 18 patterns of pixel arguments, of which only some patterns are in the axial direction or diagonal direction. This is not limited to the first quadrant but applies to all the quadrants. That is, selecting the axial direction and the diagonal direction out of the arguments of motion vectors is equivalent to probabilistically selecting motion vectors whose norms are small. Therefore, by passing the motion vectors through an axial or diagonal argument filter, the norms of the motion vectors to be inputted to stages subsequent to the argument filter can be substantially limited.

In the edge (contour) portion of an image, a small motion occurs in the image between frames. This small motion is supposed to have resulted from the optical system noise and so on of the imaging system. This small motion tends to appear as a motion vector having an axial or diagonal argument in an encoded image signal. Hence, the edge of an image can be detected with using motion vectors through detection of a motion vector having an axial or diagonal argument.

Therefore, the edge of the image can be detected based on the determination result output from the edge determiner 305.

Figure 5:
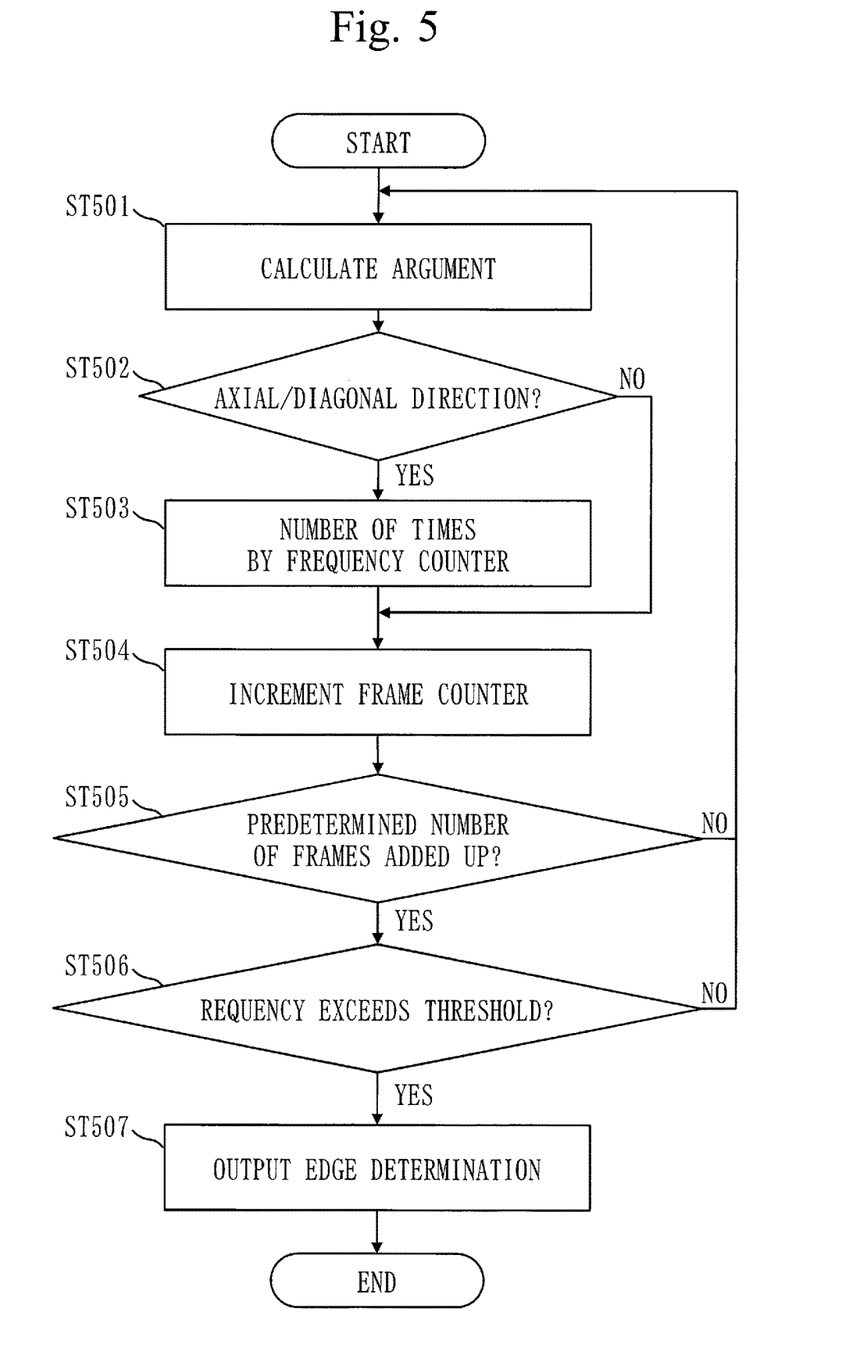
FIG. 5 is a flowchart illustrating processing details of the image processing apparatus according to Embodiment 2 of the present invention.

FIG. 5 is a flowchart of the image processing apparatus according to Embodiment 2 of the present invention. The flow of edge detection according to Embodiment 2 of the present invention will now be described with referring to FIG. 5.

The argument calculation part 301 calculates the argument of a motion vector inputted per frame and outputs the calculated argument to the argument filter 302 (ST501). The argument filter 302 determines whether or not the argument inputted from the argument calculation part 301 is in one of the axial direction and the diagonal direction, and outputs a determination result to the frequency counter 303 (ST502). If the determination result of the argument filter 302 indicates true, the frequency counter 303 increments the number of times the argument filter 302 has made determination in the macroblock where the motion vector exists (ST503).

After that, the frame counter 304 updates the counter value of its own and records the number of inputted frames (ST504). If the counter value of the frame counter 304 is equal to or less than the predetermined integrated number of frames, the flow moves to the process for a motion vector of the next frame (ST505). If the value of the frame counter 304 exceeds the predetermined integrated number of frames, whether or not the value of the frequency counter 303 exceeds a threshold is judged (ST506). If the value exceeds the threshold, the macroblock where this motion vector is located is determined as an edge, and an edge position is outputted (ST507).

This embodiments indicates an example where motion vectors whose arguments are in the axial direction or diagonal direction are counted and utilized for edge determination. Alternatively, only axial arguments, only diagonal arguments, or other arguments, or a combination of such arguments may be used for edge determination.

Because of the above configuration, the image processing apparatus according to Embodiment 2 is capable of detecting an edge from an encoded image signal by utilizing a motion vector having a specific argument such as an argument in the axial direction or diagonal direction resulting from the optical system noise of the imaging system.

Embodiment 3

Figure 6:
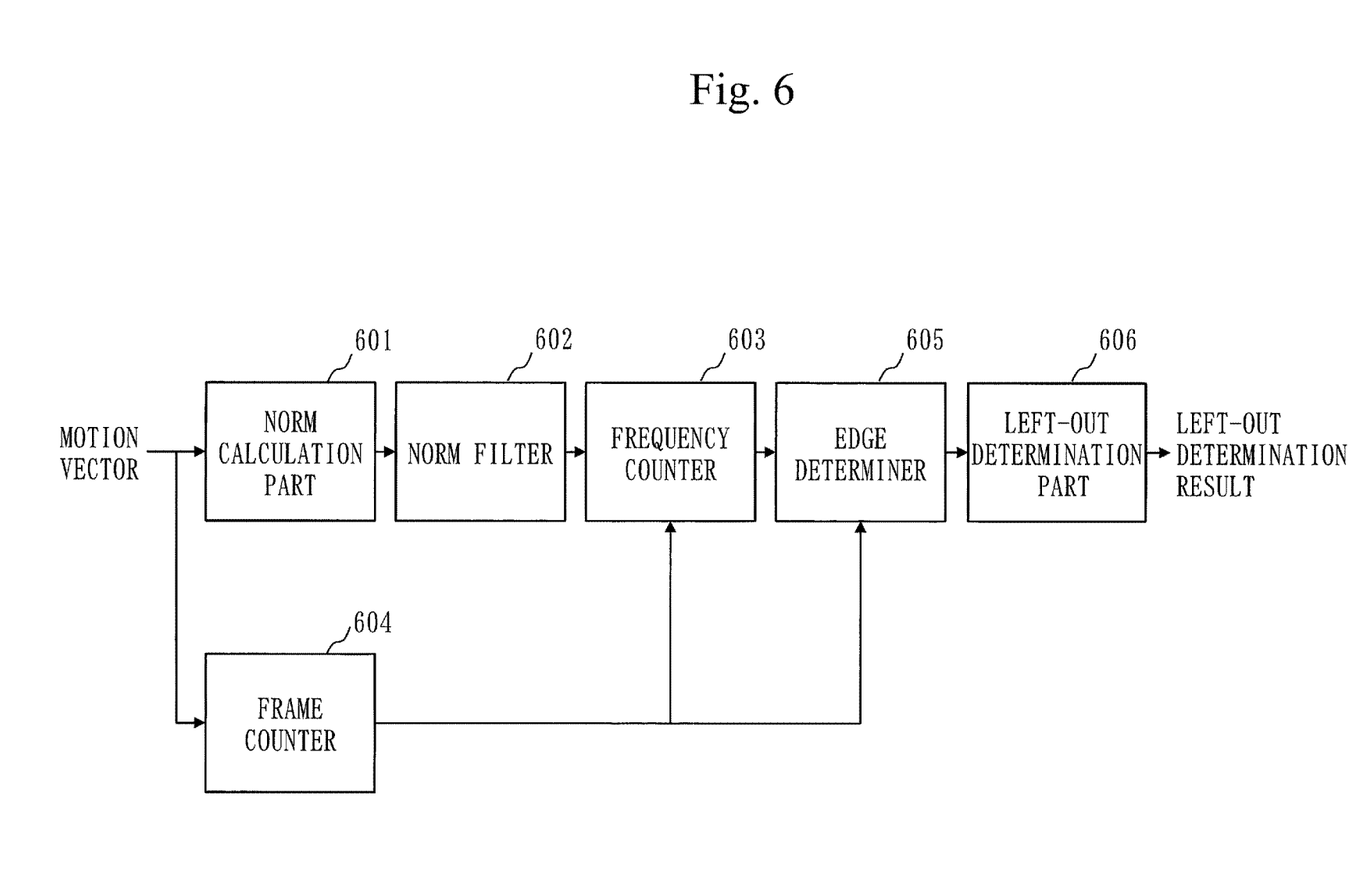
FIG. 6 is a configuration diagram illustrating an image processing apparatus according to Embodiment 3 of the present invention.

FIG. 6 is a configuration diagram illustrating an example of an image processing apparatus according to Embodiment 3 of the present invention. Referring to FIG. 6, reference numeral 601 denotes a norm calculation part; 602, a norm filter; 603, a frequency counter; 604, a frame counter; 605, an edge determiner; and 606, a left-out determination part.

The norm calculation part 601, norm filter 602, frequency counter 603, frame counter 604, and edge determiner 605 are identical with the norm calculation part 101, norm filter 102, frequency counter 103, frame counter 104, and edge determiner 105, respectively, of Embodiment 1, and a description thereof will accordingly be omitted.

The left-out determination part 606 records the time period during which the edge determiner 605 successively determines a macroblock as being an edge and thereby detects the edge, for each macroblock. If there is a macroblock where an edge is detected successively for a predetermined period of time, the left-out determination part 606 concludes that there is a left-out object that has been held temporarily, and outputs a detection result. During that time, accurate left-out detection is realized by excluding, as a background component, a macroblock determined to be an edge successively for a long period of time equal to or larger than a certain threshold, from being detected. That is, the left-out determination part 606 records the time period during which the edge determiner 605 successively judges a macroblock as being an edge and thereby detects the edge, for each macroblock. When the time period of detection adds up to fall within the range of a predetermined time period, the left-out determination part 606 determines a portion corresponding to this macroblock as being a left-out object, and outputs a determination result.

In Embodiment 3 of the present invention, the left-out determination part 606 records the frequency with which a motion vector having a small norm occurs, over a predetermined time duration. A portion successively determined by the edge determiner 605 as being an edge for a predetermined period of time can be judged as being a subject that has been held for a predetermined time duration or more, namely, a left-out object.

Figure 7:
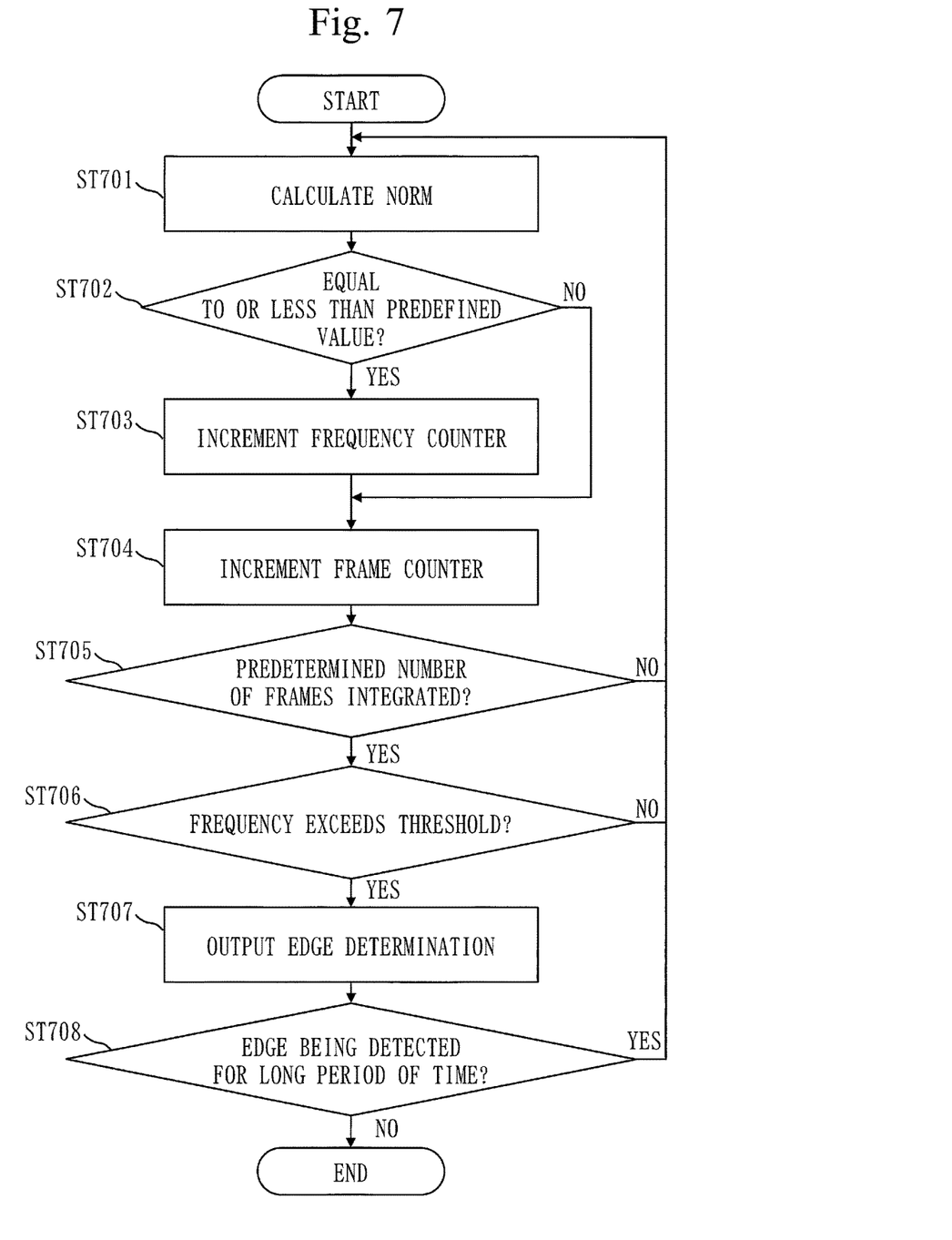
FIG. 7 is a flowchart illustrating processing details of the image processing apparatus according to Embodiment 3.

FIG. 7 is a flowchart of the image processing apparatus according to Embodiment 3 of the present invention. The flow of left-out object detection according to Embodiment 3 of the present invention will now be described with referring to FIG. 7.

The norm calculation part 601 calculates the norm of a motion vector inputted per frame and outputs the calculated norm to the norm filter 602 (ST701). The norm filter 602 determines whether or not the norm inputted from the norm calculation part 601 is equal to or less than the predetermined reference value and outputs a determination result to the frequency counter 603 (ST702). If the output from the norm filter 602 is below the reference value, the frequency counter 603 increments the number of times the norm filter 602 has made determination in the macroblock where the motion vector exists (ST703).

After that, the frame counter 604 updates the counter value of its own and records the number of inputted frames (ST704). If the counter value of the frame counter 604 is equal to or less than the predetermined integrated number of frames, the flow moves to the process for the next motion vector (ST705). If the value of the frame counter 604 exceeds the predetermined integrated number of frames, whether or not the value of the frequency counter 603 exceeds a threshold is judged (ST706). If the value exceeds the threshold, the macroblock where this motion vector is located is determined as an edge, and an edge position is outputted (ST707). The left-out determination part 606 records the time period during which each macroblock is successively determined by the edge determiner 605 as being an edge. If there is a macroblock determined as an edge successively, the left-out determination part 606 concludes that there is a left-out object, and outputs a detection result. A macroblock determined as being an edge over a long period of time is concluded as being a background and is excluded from being detected as a left-out object. As a result, accurate left-out object detection is realized.

Because of the above configuration, the image processing apparatus according to Embodiment 3 is capable of detecting a left-out object from an encoded image signal by utilizing a detection time period of a motion vector having a small norm resulting from the optical system noise of the imaging system.

Embodiment 4

Figure 8:
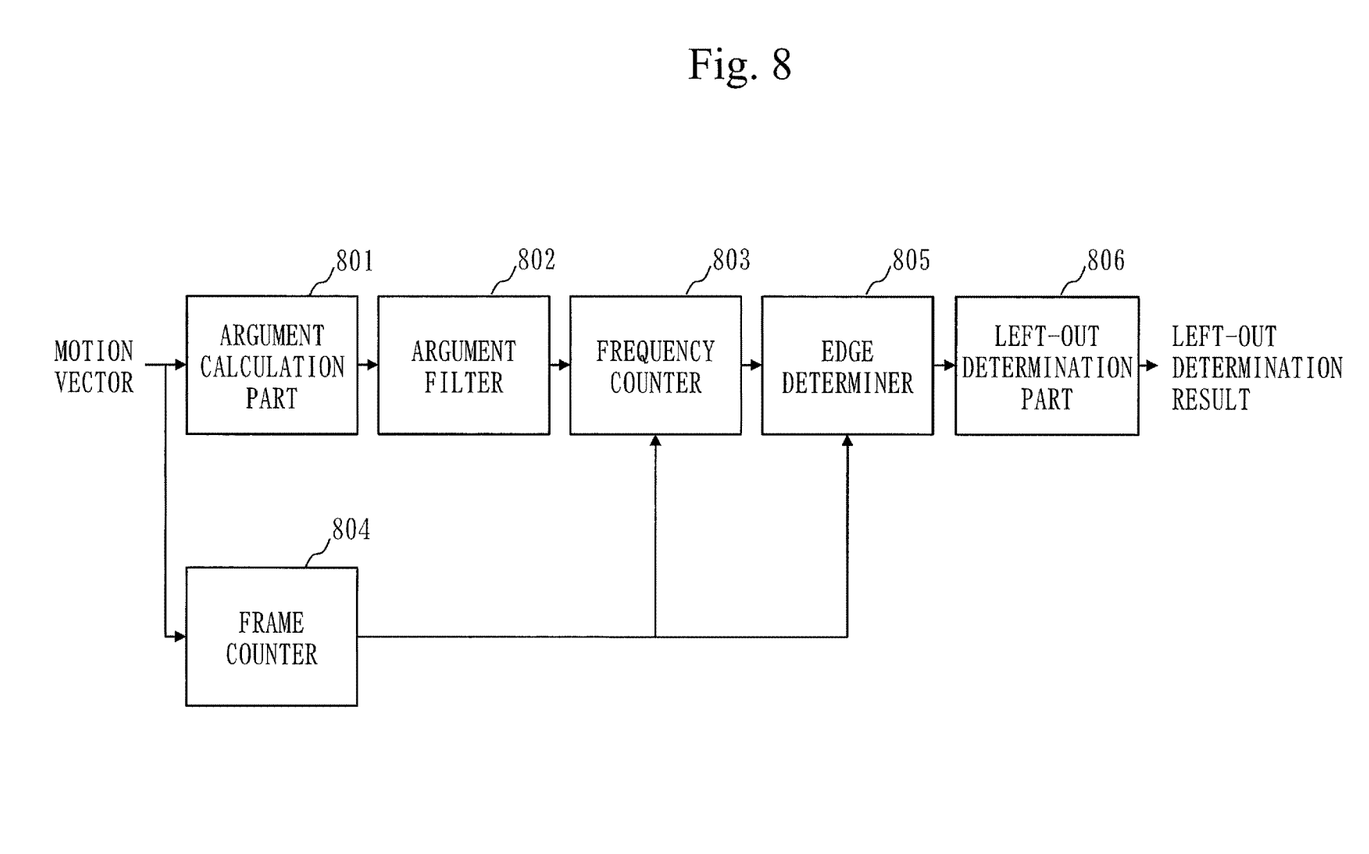
FIG. 8 is a configuration diagram illustrating an image processing apparatus according to Embodiment 4 of the present invention.

FIG. 8 is a configuration diagram illustrating an example of an image processing apparatus according to Embodiment 4 of the present invention. Referring to FIG. 8, reference numeral 801 denotes an argument calculation part; 802, an argument filter; 803, a frequency counter; 804, a frame counter; 805, an edge determiner; and 806, a left-out determination part.

The argument calculation part 801, argument filter 802, frequency counter 803, frame counter 804, and edge determiner 805 are identical with the argument calculation part 301, argument filter 302, frequency counter 303, frame counter 304, and edge determiner 305, respectively, of Embodiment 2, and a description thereof will accordingly be omitted.

The left-out determination part 806 records the time period during which the edge determiner 805 successively determines a macroblock as being an edge, for each macroblock. If there is a macroblock where an edge is detected successively for a predetermined period of time, the left-out determination part 806 concludes that there is a left-out object that has been held temporarily, and outputs a detection result. Furthermore, accurate left-out detection is realized by excluding, as a background component, a macroblock determined to be an edge successively for a long period of time, from being detected. That is, the left-out determination part 806 records the time period during which the edge determiner 805 judges a macroblock as being an edge successively and thereby detects the edge, for each macroblock. When the time period of detection adds up to fall within the range of a predetermined time period, the left-out determination part 806 determines a portion corresponding to this macroblock as being a left-out object, and outputs a determination result.

In Embodiment 4 of the present invention, it is necessary to record the frequency with which a motion vector having a small norm occurs, over a predetermined time duration. Therefore, a portion determined by the edge determiner 805 as being an edge can be judged as being a subject that has been held for a predetermined time duration or more, namely, a left-out object.

Figure 9:
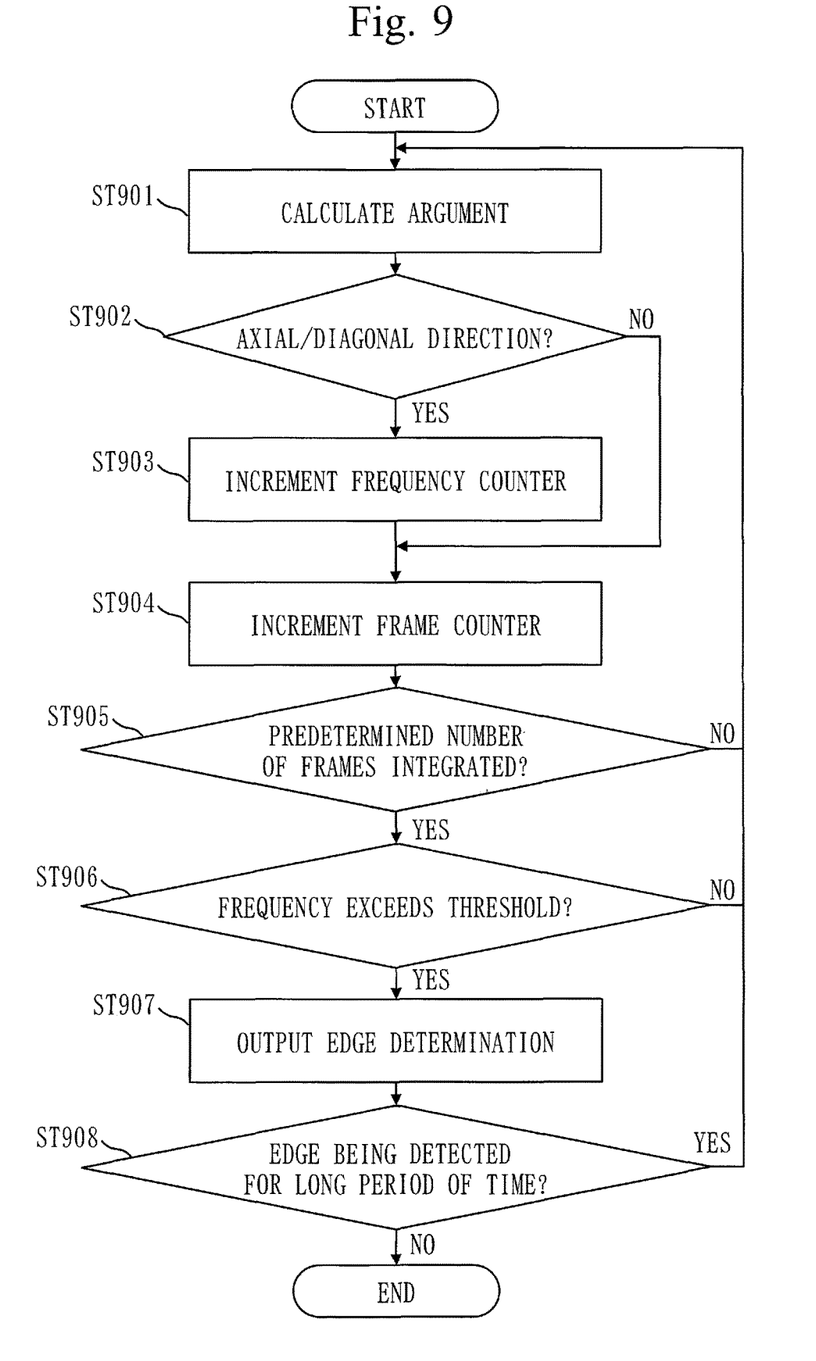
FIG. 9 is a flowchart illustrating processing details of the image processing apparatus according to Embodiment 4.

FIG. 9 is a flowchart of the image processing apparatus according to Embodiment 4 of the present invention. The flow of left-out object detection according to Embodiment 4 of the present invention will now be described with referring to FIG. 9.

The argument calculation part 801 calculates the argument of a motion vector inputted per frame and outputs the calculated argument to the argument filter 802 (ST901). The argument filter 802 determines whether or not the argument inputted from the argument calculation part 801 is in one of the axial direction and the diagonal direction, and outputs a determination result to the frequency counter 803 (ST902). Argument determination can be done with using an angle in a direction other than the axial direction or diagonal direction. If the determination result of the argument filter 802 indicates true, the frequency counter 803 increments the number of times the argument filter 802 has made determination in the macroblock where the motion vector exists (ST903).

After that, the frame counter 804 updates the counter value of its own and records the number of inputted frames (ST904). If the counter value of the frame counter 804 is equal to or less than the predetermined integrated number of frames, the flow moves to the process for the next motion vector (ST905). If the value of the frame counter 804 exceeds the predetermined integrated number of frames, whether or not the value of the frequency counter 803 exceeds a threshold is judged (ST906). If the value exceeds the threshold, the macroblock where this motion vector is located is determined as an edge, and an edge position is outputted (ST907).

Because of the above configuration, the image processing apparatus according to Embodiment 4 is capable of detecting a left-out object from an encoded image signal by utilizing a detection time period of a motion vector having a specific argument resulting from the optical system noise of the imaging system.

INDUSTRIAL APPLICABILITY

As described above, the image processing apparatus according to the present invention can be applied to an apparatus that detects an edge from an encoded moving picture, an apparatus that detects a left-out object, and so on.

REFERENCE SIGNS LIST

101: norm calculation part; 102: norm filter; 103: frequency counter; 104: frame counter; 105: edge determiner; 301: argument calculation part; 302: argument filter; 303: frequency counter; 304: frame counter; 305: edge determiner; 601: norm calculation part; 602: norm filter; 603: frequency counter; 604: frame counter; 605: edge determiner; 606: left-out determination part; 801: argument calculation part; 802: argument filter; 803: frequency counter; 804: frame counter; 805: edge determiner; 806: left-out determination part

The invention claimed is:

1. An image processing apparatus comprising:
a memory; and
a processor configured to
receive motion vectors of an encoded image signal and calculate, for each macroblock, information concerning a motion of an image; from the motion vectors;
filter to let through motion vectors each having a predetermined piece of information out of the information calculated;
count the number of frames of the encoded image signal and, when the counted number reaches a predetermined number of frames; output a count end signal;
integrate a frequency of the filtered motion vectors over the predetermined number of frames for each macroblock; and
determine, upon reception of the count end signal, whether or not the integrated frequency for each macroblock exceeds a threshold, and if the integrated frequency for a macroblock exceeds the threshold, judge the macroblock concerned as being an edge; and
output an edge position.

2. The image processing apparatus according to claim 1, wherein the processor is further configured to
calculate norms of the motion vectors, and
filter the motion vectors to let through motion vectors each having a calculated norm value equal to or less than a predetermined value out of the norms.

3. The image processing apparatus according to claim 1, wherein the processor is further configured to
calculate arguments of the motion vectors, and
filter the motion vectors to let through motion vectors each having an argument of a predetermined value out of the arguments.

4. The image processing apparatus according to claim 3, wherein the argument of the predetermined value comprises a diagonal argument and an axial argument.

5. The image processing apparatus according to claim 1, wherein the processor is further configured to
record a time period during which the processor successively judges a macroblock as being an edge and thereby detects the edge, for each macroblock, and when the time period of detection adds up to fall within a range of a predetermined time period, determine a portion corresponding to the macroblock as being a left-out object, and output a determination result.

\* \* \* \* \*